US012266318B2

(12) United States Patent
Kim et al.

(10) Patent No.: US 12,266,318 B2
(45) Date of Patent: Apr. 1, 2025

(54) POWER CONTROL DEVICE AND CONTROL METHOD OF DISPLAY HAVING CONTROL COMMAND DATA WITH VARIED PULSE LENGTH

(71) Applicant: LG Display Co., Ltd., Seoul (KR)

(72) Inventors: Jung Jae Kim, Paju-si (KR); Dong Won Park, Paju-si (KR); Yong Chul Kwon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/470,197

(22) Filed: Sep. 19, 2023

(65) Prior Publication Data

US 2024/0212630 A1 Jun. 27, 2024

(30) Foreign Application Priority Data

Dec. 23, 2022 (KR) ........................ 10-2022-0183509

(51) Int. Cl.
*G09G 3/32* (2016.01)
*G09G 3/3291* (2016.01)

(52) U.S. Cl.
CPC ..... *G09G 3/3291* (2013.01); *G09G 2330/021* (2013.01); *G09G 2360/08* (2013.01)

(58) Field of Classification Search
CPC ............. G09G 3/3291; G09G 2360/08; G09G 2330/021
See application file for complete search history.

(56) References Cited

U.S. PATENT DOCUMENTS

| | | | | |
|---|---|---|---|---|
| 5,644,579 A * | 7/1997 | Sheppard | G11C 29/32 | 714/724 |
| 2012/0076232 A1* | 3/2012 | Schmidt | H03M 5/08 | 375/295 |
| 2014/0140390 A1* | 5/2014 | Kashima | H04L 25/4902 | 375/238 |
| 2021/0026795 A1* | 1/2021 | Li | H03M 13/37 | |
| 2021/0407355 A1* | 12/2021 | Ju | G09G 3/20 | |

* cited by examiner

*Primary Examiner* — Liliana Cerullo
(74) *Attorney, Agent, or Firm* — Seed IP Law Group LLP

(57) ABSTRACT

A power control device of a display apparatus includes a display panel configured to include a plurality of pixels, a panel driver configured to drive the display panel, a power control unit configured to output a power control signal into which one or more pieces of control command data are encoded, and a power source unit configured to shift an output level of a source voltage needed for an operation of each of the display panel and the panel driver, based on the control command data, wherein the control command data comprises a plurality of control pulses where a logic low period and a logic high period are alternated, and the logic low period is implemented with two or more different lengths.

17 Claims, 8 Drawing Sheets

POWER CONTROL DEVICE AND CONTROL METHOD OF DISPLAY HAVING CONTROL COMMAND DATA WITH VARIED PULSE LENGTH

CROSS-REFERENCE TO RELATED APPLICATIONS

This application claims the benefit of the Korean Patent Application No. 10-2022-0183509 filed on Dec. 23, 2023, which is hereby incorporated by reference as if fully set forth herein.

BACKGROUND

Technical Field

The present disclosure relates to a power control device and a control method of a display apparatus.

Description of the Related Art

Display apparatuses include a power source unit which generates source voltages for driving thereof. The power source unit performs an on/off operation and an output variation operation, based on a power control signal received through a power interface circuit.

Because the power source unit recognizes a power control command by counting the number of pulses which have the same waveform and are included in the power control signal, when there are various kinds and a number of power control commands, there is a problem where an interfacing time needed for transferring/receiving the power control signal increases.

BRIEF SUMMARY

The present disclosure provides a power control device and a control method of a display apparatus, which may shorten an interfacing time needed for transferring/receiving a power control signal without an increase in the number of transfer ports of a power interface circuit.

As embodied and broadly described herein, a power control device of a display apparatus includes a display panel configured to include a plurality of pixels, a panel driver configured to drive the display panel, a power control unit configured to output a power control signal into which one or more pieces of control command data are encoded, and a power source unit configured to shift an output level of a source voltage for an operation of each of the display panel and the panel driver, based on the control command data, wherein the control command data includes a plurality of control pulses where a logic low period and a logic high period are alternated, and the logic low period is implemented with two or more different lengths.

In another aspect of the present disclosure, a power control method of a display apparatus includes outputting a power control signal into which one or more pieces of control command data are encoded and shifting an output level of a source voltage for an operation of each of a display panel and a panel driver, based on the control command data, wherein the control command data includes a plurality of control pulses where a logic low period and a logic high period are alternated, and the logic low period is implemented with two or more different lengths.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
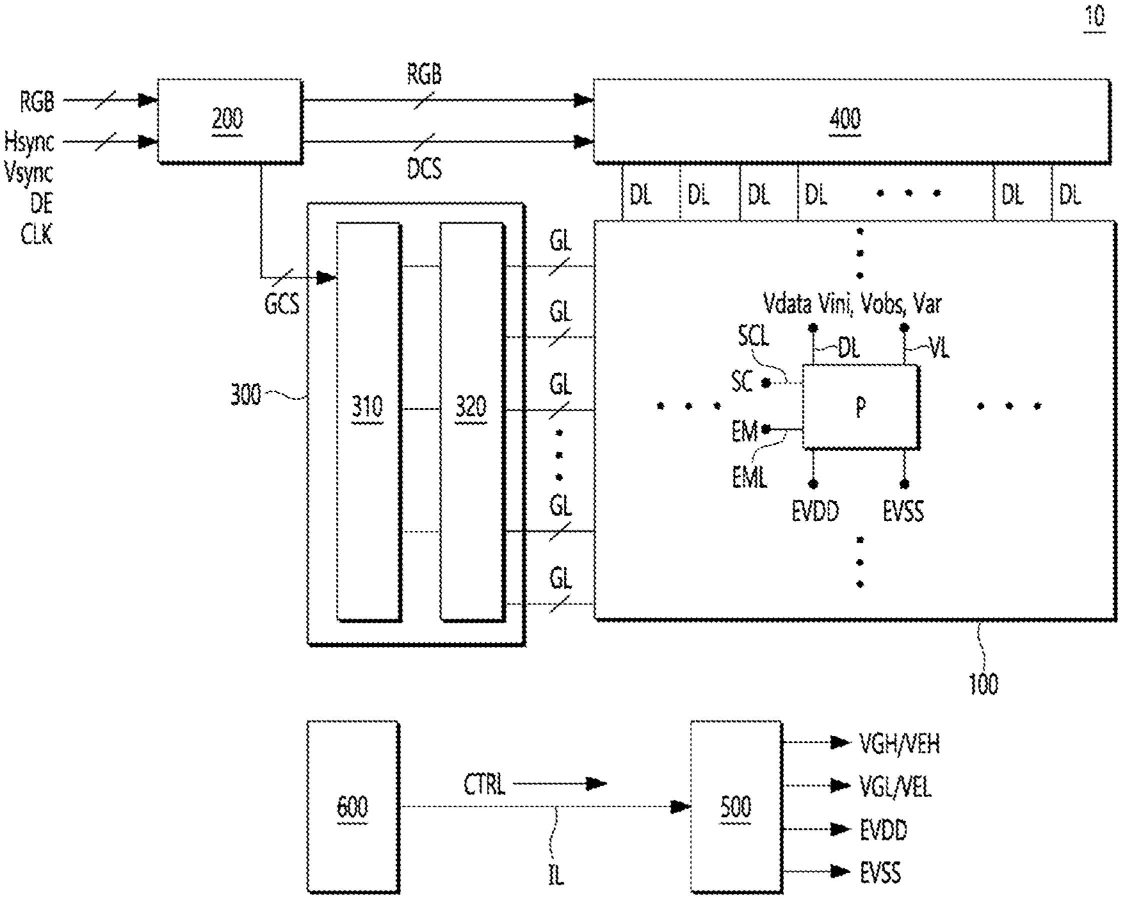
FIG. 1 is a block diagram illustrating a display apparatus according to an embodiment of the present disclosure.

Hereinafter, example embodiments of the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted.

FIG. 1 is a block diagram illustrating a display apparatus 10 according to an embodiment of the present disclosure.

Referring to FIG. 1, the display apparatus 10 may include a display panel 100 which includes a plurality of pixels P, a controller 200, a gate driver 300 which supplies a gate signal to each of the plurality of pixels P, a data driver 400 which supplies a data signal (or a data voltage) to each of the plurality of pixels P, a power source unit 500 which supplies power for driving of each of the plurality of pixels P and a panel driver, and a power controller 600 which supplies the power source unit 300 with a power control signal CTRL including one or more pieces of control command data. The panel driver may include the gate driver 300 and the data driver 400.

The display panel 100 may include a display area AA (see FIG. 2) where the pixels P are provided and a non-display area NA (see FIG. 2) which is disposed to surround the display area AA and where the gate driver 300 and the data driver 400 are disposed.

In the display panel 100, a plurality of gate lines GL may intersect with a plurality of data lines DL, and each of the plurality of pixels P may be connected to a gate line GL and a data line DL. In detail, each pixel P may be supplied with the gate signal from the gate driver 300 through the gate line GL, supplied with a data signal from the data driver 400 through the data line DL, and supplied with a high level driving voltage EVDD and a low level driving voltage EVSS from the power source unit 500.

The gate line GL may transfer a scan signal SC and an emission control signal EM to the plurality of pixels P, and the data line DL may transfer a data voltage Vdata to the plurality of pixels P. The gate line GL according to various embodiments may include a plurality of scan lines SCL for transferring the scan signal SC and a plurality of emission control signal lines EML for transferring the emission control signal EM. The plurality of pixels P may be supplied with a bias voltage Vobs and an initialization voltage (Var, Vini) through a power line VL.

Figure 2:
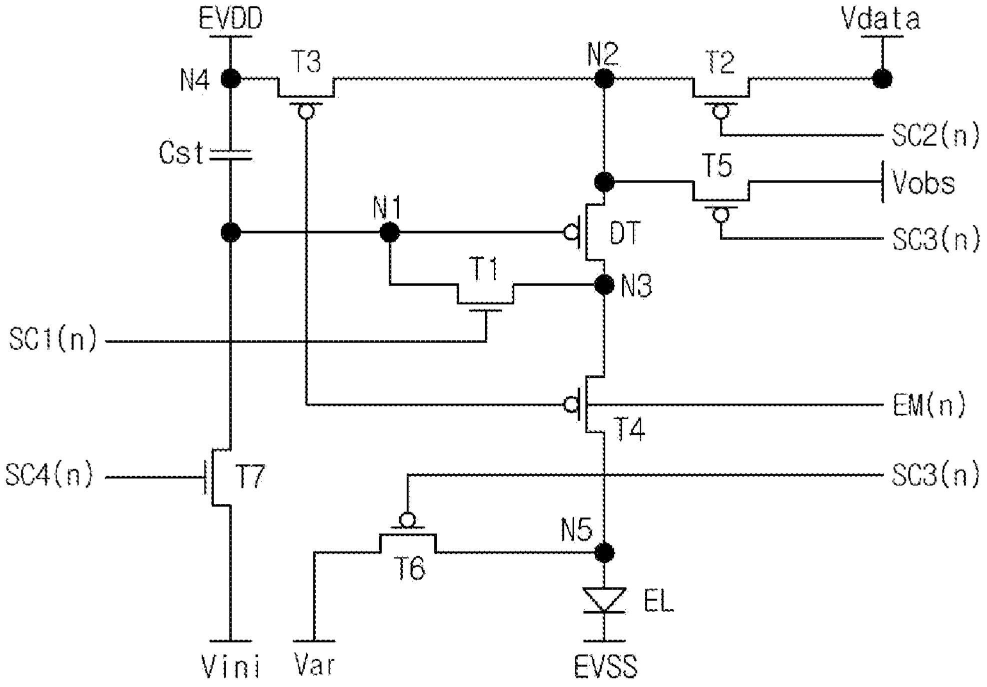
FIG. 2 is a diagram illustrating a pixel circuit in a display apparatus according to an embodiment of the present disclosure.

Each of the pixels P, as illustrated in FIG. 2, may include a light emitting device EL and a pixel circuit which controls driving of the light emitting device EL. The light emitting device EL may include an anode electrode, a cathode electrode, and an emission layer between the anode electrode and the cathode electrode.

The pixel circuit may include a plurality of switching elements, a driving element, and a capacitor. The switching element and the driving element may configure a thin film transistor (TFT). The driving element may control the amount of current supplied to the light emitting device EL on the basis of the data voltage Vdata to adjust the amount of light emitted from the light emitting device EL. The plurality of switching elements may be turned on based on the scan signal SC supplied through the plurality of scan lines SCL and the emission control signal EM supplied through the emission control line EML.

The display panel 100 may be implemented as a non-transmissive display panel or a transmissive display panel. The transmissive display panel may be applied to a transparent display apparatus which displays an image on a screen and where a thing of a background is seen. The display panel 100 may be implemented as a flexible display panel. The flexible display panel may be implemented as an organic light emitting diode (OLED) panel including a plastic substrate.

Each of the pixels P may be divided into a red pixel, a green pixel, and a blue pixel, so as to implement a color. Each pixel P may further include a white pixel. Each pixel P may include a pixel circuit.

A plurality of touch sensors may be disposed on the display panel 100. A touch input may be sensed by using separate touch sensors, or may be sensed through the pixels P. The touch sensors may be arranged on a screen of the display panel 100 as an on-cell type or an add-on type, or may be implemented as in-cell type touch sensors embedded in the display panel 100.

The controller 200 may process video data RGB input from the outside, based on a size and a resolution of the display panel 100, and thus, may supply image data to the data driver 400. The controller 200 may generate a gate control signal GCS and a data control signal DCS by using synchronization signals (for example, a dot clock signal CLK, a data enable signal DE, a horizontal synchronization signal Hsync, and a vertical synchronization signal Vsync) input from the outside. The controller 200 may supply the gate control signal GCS to the gate driver 300 to control an operation timing of the gate driver 300. The controller 200 may supply the data control signal DCS to the data driver 400 to control an operation timing of the data driver 400. The controller 200 may synchronize an operation timing of the gate driver 300 with an operation timing of the data driver 400 by using the gate control signal GCS and the data control signal DCS.

The controller 200 may be coupled to various processors (for example, a microprocessor, a mobile processor, or an application processor), based on a device mounted thereon.

A host system may be one of a television (TV) system, a set-top box, a navigation system, a personal computer (PC), a home theater system, a mobile device, a wearable device, and a vehicle system.

The controller 200 may multiply an input frame frequency by i times to control an operation timing of a display panel driver, based on a frame frequency of an input frame frequency Xi (where i is a positive integer of more than 0) Hz. The input frame frequency may be about 60 Hz in national television standards committee (NTSC) scheme and may be about 50 Hz in phase-alternating line (PAL) scheme.

The controller 200 may drive the pixel P at various refresh rates. The controller 200 may drive the pixel P in a variable refresh rate (VRR) mode, and for example, may drive the pixel P so as to switch between a first refresh rate and a second refresh rate. For example, the controller 200 may simply change a speed of a clock signal, or generate the synchronization signal so that a horizontal blank or a vertical blank occurs, or drive the gate driver 300 on the basis of a mask scheme, thereby driving the pixel P at various refresh rates.

A voltage level of the gate control signal GCS output from the controller 200 may be shifted to a gate-on voltage (VGL, VEL) and a gate-off voltage (VGH, VEH) by using a level shifter (not shown) and may be supplied to the gate driver 300. The level shifter may shift a low level voltage of the gate control signal GCS to a gate low voltage VGL and may shift a high level voltage of the gate control signal GCS to a gate high voltage VGH. The gate control signal GCS may include a start pulse and a shift clock.

The gate driver 300 may supply the gate signal to the gate line GL, based on the gate control signal GCS supplied from the controller 200. The gate driver 300 may be disposed at one side or both sides of the display panel 100 in a gate in panel (GIP) type.

The gate driver 300 may sequentially output the gate signal to the plurality of gate lines GL, based on control by the controller 200. The gate driver 300 may shift the gate signal by using the level shifter, and thus, may sequentially supply the signals to the gate lines GL.

The gate signal may include the scan signal SC and the emission control signal EM, in an organic light emitting display apparatus. The scan signal SC may include a scan pulse which swings between the gate-on voltage VGL and the gate-off voltage VGH. The emission control signal EM may include an emission control signal pulse which swings between the gate-on voltage VEL and the gate-off voltage VEH. The scan pulse may be used to select pixels P of a line to which the data voltage Vdata is to be applied. The emission control signal EM may indicate an emission time of each of the pixels P.

The gate driver 300 may include an emission control signal driver 310 and one or more scan drivers 320.

The emission control signal driver 310 may output the emission control signal pulse in response to the start pulse and the shift clock from the controller 200 and may sequentially shift the emission control signal pulse, based on a shift clock.

The one or more scan drivers 320 may shift the scan pulse in response to the start pulse and the shift clock from the controller 200 and may shift the scan pulse, based on a shift clock timing.

The data driver 400 may convert image data RGB into the data voltage Vdata, based on the data control signal DCS supplied from the controller 200, and may supply the data voltage Vdata to the pixel P through the data line DL.

In FIG. 1, it is illustrated that the data driver 400 is disposed at one side of the display panel 100 in one type, but the number and arrangement positions of data drivers 400 are not limited thereto. That is, the data driver 400 may be configured as a plurality of integrated circuits (ICs) and may be provided and arranged in plurality at one side of the display panel 100.

The power source unit 500 may generate a direct current (DC) power provided to the display panel driver and the pixel array of the display panel 100 for driving of the display panel driver and the pixel array of the display panel 100 by using a DC-DC converter. The DC-DC converter may include a charge pump, a regulator, a buck converter, and a boost converter. The power source unit 500 may receive a DC input voltage applied from the host system (not shown) to generate DC voltages such as the gate-on voltage (VGL, VEL), the gate-off voltage (VGH, VEH), the high level driving voltage EVDD, and the low level driving voltage EVSS. The gate-on voltage (VGL, VEL) and the gate-off voltage (VGH, VEH) may be supplied to the level shifter (not shown) and the gate driver 300. The high level driving voltage EVDD and the low level driving voltage EVSS may be supplied to the pixels P in common.

The power controller 600 may be connected with the power source unit 500 through an interface line IL. A transfer circuit of the power controller 600 and a reception circuit of the power source unit 500 may configure a power interface circuit. The power interface circuit may use a single-wire (S-Wire) communication protocol so as to reduce the number of transfer ports.

In this case, the transfer circuit of the power controller 600 may encode one or more pieces of control command data into the power control signal CTRL in a continuous pulse type and may output encoded control command data to the interface line IL. The reception circuit of the power source unit 500 may decode the power control signal CTRL to recover the control command data included in the power control signal CTRL. Also, the power source unit 500 may shift an output level of a source voltage (for example, the gate-on voltage (VGL, VEL), the gate-off voltage (VGH, VEH), the high level driving voltage EVDD, or the low level driving voltage EVSS) for an operation of each of the display panel 100 and the panel drivers 300 and 400, based on the control command data. Because it is not required to transfer a clock synchronized with the control command data, the single-wire (S-Wire) communication protocol may be easy to decrease a transfer port and a transfer line.

The power controller 600 may be embedded in the data driver 400 or the controller 200, but is not limited thereto.

FIG. 2 is a diagram illustrating a pixel circuit in a display apparatus according to an embodiment of the present disclosure.

FIG. 2 illustrates only one pixel circuit. The pixel circuit according to the present disclosure may include all structures where a light emitting device EL is controlled by an emission signal EM(n) applied thereto to emit light. For example, the pixel circuit may include a switching transistor to which an additional scan signal is applied and a switching transistor to which an additional initialization voltage is applied, and a connection relationship of the switching transistor or a connection position of a capacitor may be variously disposed. Hereinafter, for convenience, a display apparatus having a pixel circuit structure of FIG. 2 will be described.

Referring to FIG. 2, each of a plurality of pixels P may include a pixel circuit including a driving transistor DT and a light emitting device EL connected to the driving transistor DT.

The pixel circuit may control a driving current flowing in the light emitting device EL to drive the light emitting device EL. The pixel circuit may include the driving transistor DT, first to seventh switching transistors T1 to T7, and a capacitor Cst. Each of the first to seventh switching transistors T1 to T7 may include a first electrode, a second electrode, and a gate electrode. One of the first electrode and the second electrode may be a source electrode, and the other of the first electrode and the second electrode may be a drain electrode.

Each of the driving transistor DT and the first to seventh switching transistors T1, T2, T3, T4, T5, T6, and T7 (T1 to T7) may be a P-type TFT or an N-type TFT. In the embodiment of FIG. 2, the first switching transistor T1 and the seventh switching transistor T7 may each be an N-type TFT, and the other transistors DT and T2, T2, T3, T4, T5, and T6 (T2 to T6) may each be a P-type TFT. However, the present disclosure is not limited thereto, and according to embodiments, all or some of the transistors DT and T1 to T7 may each be a P-type TFT or an N-type TFT. Also, an N-type TFT may be an oxide TFT, and a P-type TFT may be a polycrystalline silicone TFT.

Hereinafter, an example is described where each of the first switching transistor T1 and the seventh switching transistor T7 is an N-type TFT and each of the other transistors DT and T2 to T6 is a P-type TFT. Therefore, the first switching transistor T1 and the seventh switching transistor T7 may be turned on in response to a high voltage, and the other transistors DT and T2 to T6 may be turned on in response to a low voltage.

According to an embodiment, the first switching transistor T1 configuring the pixel circuit may function as a compensation transistor, the second switching transistor T2 may function as a data supply transistor, the third and fourth switching transistors T3 and T4 may each function as an emission control transistor, the fifth switching transistor T5 may function as a bias transistor, and the sixth and seventh switching transistors T6 and T7 may each function as an initialization transistor.

The light emitting device EL may include an anode electrode (or a pixel electrode) and a cathode electrode. The anode electrode of the light emitting device EL may be connected with a fifth node N5, and the cathode electrode may be connected with a low level driving voltage EVSS.

The driving transistor DT may include a first electrode connected with a second node N2, a second electrode connected with a third node N3, and a gate electrode connected with a first node N1. The driving transistor DT may transfer a driving current, corresponding to a voltage of the first node N1 (or a data voltage Vdata stored in the below-described capacitor Cst), to the light emitting device EL.

The first switching transistor T1 may include a first electrode connected with the first node N1, a second electrode connected with the third node N3, and a gate electrode which receives a first scan signal SC1(*n*). The first transistor T1 may be turned on in response to the first scan signal SC1(*n*) and may connect the first node N1 with the third node N3, and thus, may operate the driving transistor DT like a diode, thereby sampling a threshold voltage Vth of the driving transistor DT. The first switching transistor T1 may be a compensation transistor.

The capacitor Cst may be connected between the first node N1 and a fourth node N4. The capacitor Cst may store or hold a high level driving voltage EVDD.

The second switching transistor T2 may include a first electrode connected with a data line DL (or receiving the data voltage Vdata), a second electrode connected with the second node N2, and a gate electrode which receives a second scan signal SC2(*n*). The second transistor T2 may be turned on in response to the second scan signal SC2(*n*) and may transfer the data voltage Vdata to the second node N2. The second switching transistor T2 may be a data supply transistor.

The third switching transistor T3 and the fourth switching transistor T4 (or first and second emission control transistors) may be connected between the high level driving voltage EVDD and the light emitting device EL and may configure a current flow path through which a driving current generated by the driving transistor DT flows.

The third switching transistor T3 may include a first electrode which is connected with the fourth node N4 and receives the high level driving voltage EVDD, a second electrode connected with the second node N2, and a gate electrode which receives the emission control signal EM(n).

The fourth switching transistor T4 may include a first electrode connected with the third node N3, a second electrode connected with the fifth node N5 (or the anode electrode of the light emitting device EL), and a gate electrode which receives the emission control signal EM(n).

The third and fourth switching transistors T3 and T4 may be turned on in response to the emission control signal EM(n), and in this case, the driving current may be supplied to the light emitting device EL and the light emitting device EL may emit light having luminance corresponding to the driving current.

The fifth switching transistor T5 may include a first electrode which receives a bias voltage Vobs, a second electrode connected with the second node N2, and a gate electrode which receives a third scan signal SC3(*n*). The fifth switching transistor T5 may be a bias transistor.

The sixth switching transistor T6 may include a first electrode which receives a first initialization voltage Var, a second electrode connected with the fifth node N5, and a gate electrode which receives the third scan signal SC3(*n*).

Before the light emitting device EL emits light (or after the light emitting device EL emits light), the sixth switching transistor T6 may be turned on in response to the third scan signal SC3(*n*) and may initialize the anode electrode (or a pixel electrode) of the light emitting device EL by using the first initialization voltage Var. The light emitting device EL may include a parasitic capacitor which is formed between the anode electrode and the cathode electrode. Also, the parasitic capacitor may be charged while the light emitting device EL is emitting light, and the anode electrode of the light emitting device EL may have a specific voltage. Accordingly, the first initialization voltage Var may be applied to the anode electrode of the light emitting device EL through the sixth switching transistor T6, and thus, the amount of electric charges accumulated into the light emitting device EL may be initialized.

In the present disclosure, the gate electrodes of the fifth and sixth switching transistors T5 and T6 may be configured to receive the third scan signal SC3(*n*) in common. However, the present disclosure is not limited thereto, and the gate electrodes of the fifth and sixth switching transistors T5 and T6 may be configured to be independently controlled based on a separate scan signal.

The seventh switching transistor T7 may include a first electrode which receives a second initialization voltage Vini, a second electrode connected with the first node N1, and a gate electrode which receives a fourth scan signal SC4(*n*).

The seventh switching transistor T7 may be turned on in response to the fourth scan signal SC4(*n*) and may initialize the gate electrode of the driving transistor DT by using the second initialization voltage Vini. Due to the high level driving voltage EVDD stored in the capacitor Cst, an undesired electric charge may remain at the gate electrode of the driving transistor DT. Accordingly, the second initialization voltage Vini may be applied to the gate electrode of the driving transistor DT through the seventh switching transistor T7, and thus, a residual electric charge may be initialized.

Figure 3:
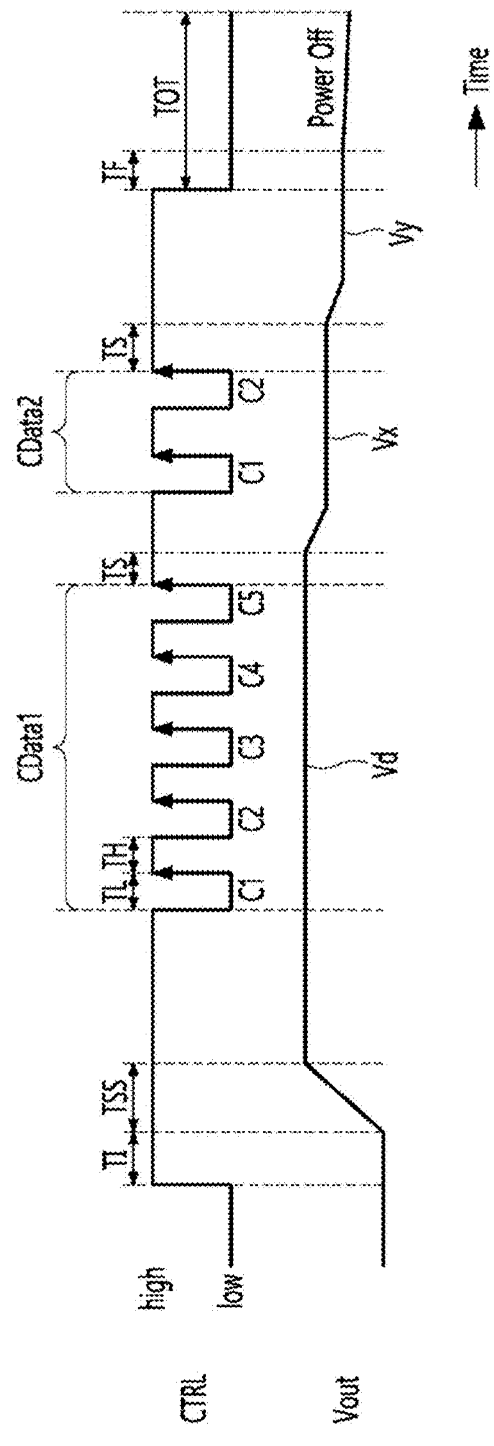
FIG. 3 (Related Art)
FIG. 3 is a waveform diagram showing an example where an output level of a source voltage is changed based on a power control signal where control command data is encoded, in a comparative example of the present disclosure.

FIG. 3 is a waveform diagram showing an example where an output level of a source voltage Vout is changed based on a power control signal CTRL where control command data CData1 and CData2 are encoded, in a comparative example of the present disclosure.

A source voltage Vout of FIG. 3 may include a gate-on voltage (VGL, VEL), a gate-off voltage (VGH, VEH), a high level driving voltage EVDD, and a low level driving voltage EVSS, which are generated by a power source unit (500 of FIG. 1).

Referring to FIG. 3, control command data CData1 and CData2 and a plurality of sequence timing control signals may be further encoded into a power control signal CTRL.

Each of the control command data CData1 and CData2 may be implemented as a plurality of control pulses where a logic low period TL and a logic high period TH are alternated. That is, a low period TL is immediately adjacent to a high period TH, and a high period TH is immediately adjacent to a low period TL. Except for the ends of the sequence of control pulses, a low period TL is immediately adjacent to a preceding high period TH and subsequent high period TH, and a high period TH is immediately adjacent to a preceding low period TL and subsequent low period TL. The logic low periods TL and the logic high periods TH of the control pulses may have the same length.

The sequence timing control signals may include "TI," "TSS," "TS," "TF," and "TOT."

"TI" may indicate a time up to a time point, at which an output of the source voltage Vout starts uprising, from a time point at which the power control signal CTRL rises from a logic low voltage to a logic high voltage.

"TSS" may indicate a time during which an output of the source voltage Vout starts uprising and rises up to a default level Vd.

"TS" may indicate a time up to a time point, at which the output level of the source voltage Vout is shifted, from a rising time of a last pulse of each of the control command data CData1 and Cdata2. "TS" may be set to be longer than the logic high period TH of each of the control command data Cdata1 and Cdata2, so as to be differentiated from the control command data Cdata1 and Cdata2.

"TF" may indicate a time up to a time point, at which the output of the source voltage Vout is turned off, from a time point at which the power control signal CTRL falls from a logic high voltage to a logic low voltage. "TF" may be set to be longer than the logic low period TL of each of the control command data CData1 and CData2, so as to be differentiated from the control command data CData1 and CData2.

The power source unit (500 of FIG. 1) may count (C1 to C5) logic low periods TL of control pulses configuring first control command data CData1 to recognize a first control command and may shift the output level of the source voltage Vout from the default level Vd to a first level Vx, based on a first control command.

The power source unit may count (C1 and C2) logic low periods TL of control pulses configuring second control command data CData2 to recognize a second control command and may shift the output level of the source voltage Vout from the first level Vx to a second level Vy, based on a second control command.

As described above, in the comparative example of FIG. 3, because a control command is recognized by counting logic low periods of control pulses configuring control command data, as the number and kind of control command data increase, a transfer/reception time of the power control signal CTRL may considerably increase. The number of transfer ports for transferring the power control signal CTRL should increase for reducing a transfer/reception time, but in this case, the manufacturing cost may increase and electromagnetic wave interference may occur.

In the present embodiments described below, methods for shortening an interfacing time needed for transferring/receiving the power control signal CTRL may be proposed without an increase in the number of transfer ports of a power interface circuit.

Figure 4:
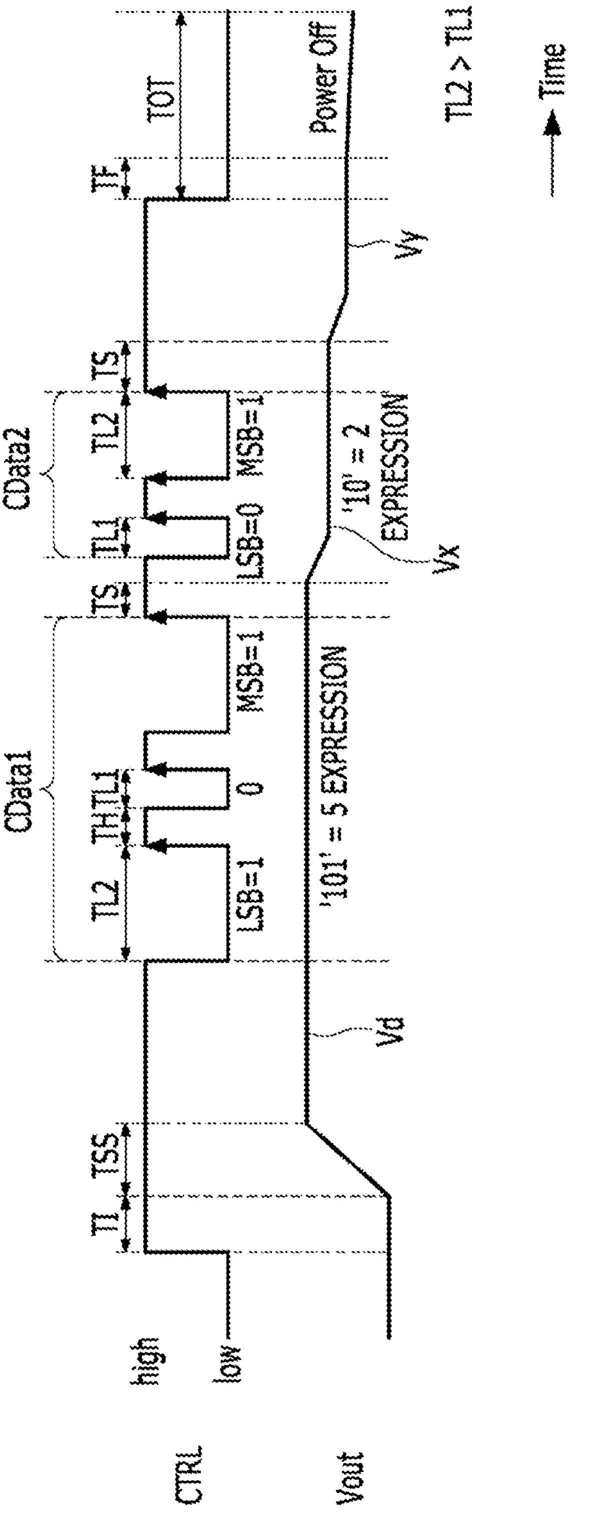
FIG. 4 is a waveform diagram showing an example where an output level of a source voltage is changed based on a power control signal where control command data is encoded, in an embodiment of the present disclosure.

FIG. 4 is a waveform diagram showing an example where an output level of a source voltage is changed based on a power control signal where control command data is encoded, in an embodiment of the present disclosure.

Referring to FIG. 4, control command data CData1 and CData2 and a plurality of sequence timing control signals may be further encoded into a power control signal CTRL.

The sequence timing control signals may be substantially the same as the description of FIG. 3.

Each of the control command data CData1 and CData2 may be implemented as a plurality of control pulses where a logic low period TL and a logic high period TH are alternated. The logic high periods TH of the control pulses may have the same length, and the logic low periods TL may have two or more different lengths.

Logic low periods of control pulses may include one or more first logic low periods TL1 having a first length and one or more second logic low periods TL2 having a second length which is greater than the first length. The first logic low period TL1 may indicate a bit value '0,' and the second logic low period TL2 may indicate a bit value '1.'

The logic low periods TL1 and TL2 included in control pulses may respectively indicate bit values of the control command data CData1 and CData2. That is, the bit values of the control command data CData1 and CData2 may be indicated based on the temporal arrangement sequence of the logic low periods TL1 and TL2 included in the control pulses.

For example, first control command data CData1 may include control pulses which are arranged in the sequence of a second logic low period TL2, a first logic low period TL1, and a second logic low period TL2, and thus, a bit value of the first control command data CData1 may be referred to as '101.' The power source unit 500 (see FIG. 1) may receive the bit value of the first control command data CData1 in the sequence from a least significant bit (LSB) to a most significant bit (MSB) or may receive the bit value of the first control command data CData1 in the sequence opposite thereto, and thus, may recognize the bit value of the first control command data CData1. The power source unit 500 may recognize a first control command, based on a bit combination of logic low periods TL1 and TL2 of control pulses configuring the first control command data CData1 and may shift an output level of a source voltage Vout from a default level Vd to a first level Vx, based on the first control command.

As another example, second control command data CData2 may include control pulses which are arranged in the sequence of a first logic low period TL1 and a second logic low period TL2, and thus, a bit value of the second control command data CData2 may be referred to as '10.' The power source unit 500 (see FIG. 1) may receive the bit value of the second control command data CData2 in the sequence from an LSB to an MSB or may receive the bit value of the second control command data CData2 in the sequence opposite thereto, and thus, may recognize the bit value of the second control command data CData2. The power source unit 500 may recognize a first control command, based on a bit combination of logic low periods TL1 and TL2 of control pulses configuring the second control command data CData2 and may shift the output level of the source voltage Vout from the first level Vx to a second level Vy, based on the second control command.

Figure 5:
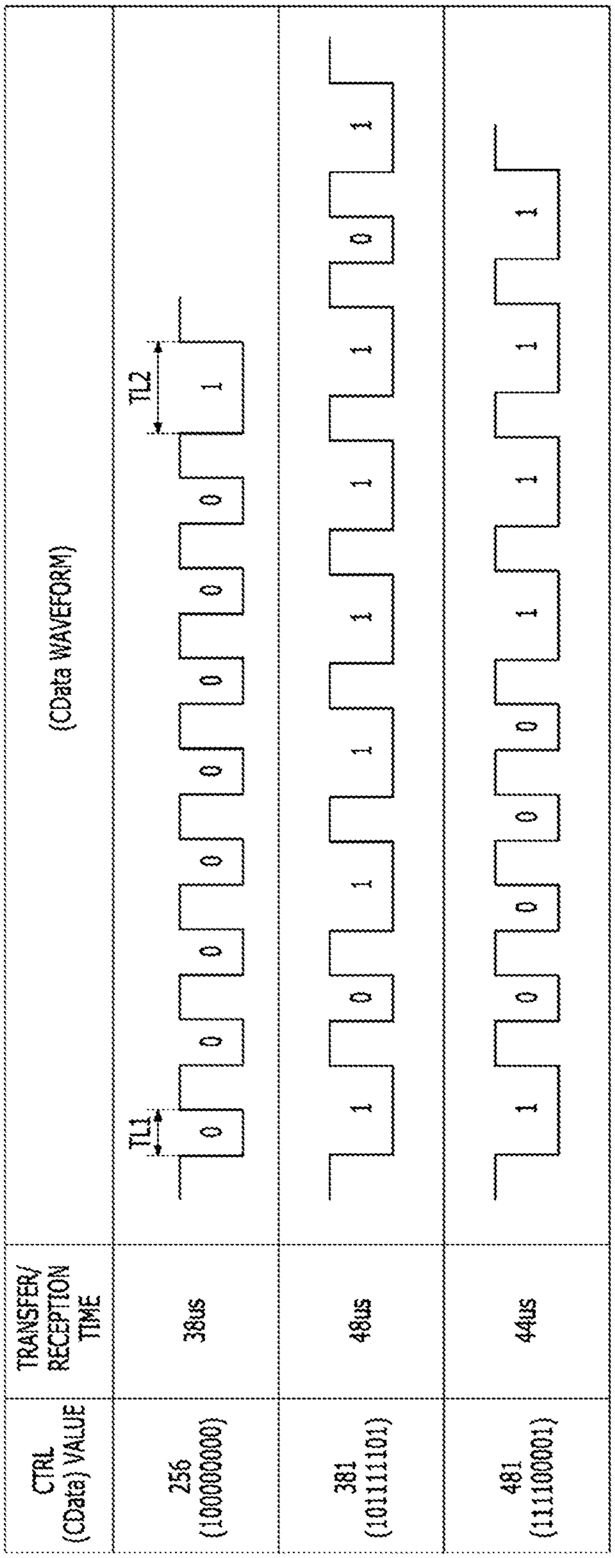
FIG. 5 is a diagram showing various values of control command data and waveforms and transfer/reception times of control command data corresponding thereto, in an embodiment of the present disclosure.

FIG. 5 is a diagram showing various values of control command data and waveforms and transfer/reception times of control command data corresponding thereto, in an embodiment of the present disclosure.

Referring to FIG. 5, various bit values of control command data CData encoded into a power control signal CTRL are shown. In an embodiment, the control command data CData may indicate 9-bit (i.e., 512) voltage levels, based on a combination of first logic low periods TL1 and a second logic low period TL2.

The control command data CData may indicate a bit value '100000000,' based on a temporal arrangement combination of eight first logic low periods TL1 and one second logic low period TL2 included in control pulses. In this case, a data value '256' may be expressed as nine control pulses, and thus, under the same condition, a transfer/reception time of the control command data CData may largely decrease to about 38 μs compared to FIG. 3 requiring 256 control pulses. The data value '256' may indicate a certain voltage level corresponding to a source voltage Vout.

The control command data CData may indicate a bit value '101111101,' based on a temporal arrangement combination of two first logic low periods TL1 and seven second logic low periods TL2 included in control pulses. In this case, a data value '381' may be expressed as nine control pulses, and thus, under the same condition, a transfer/reception time of the control command data CData may largely decrease to about 48 μs compared to FIG. 3 requiring 381 control pulses.

The control command data CData may indicate a bit value '111100001,' based on a temporal arrangement combination of four first logic low periods TL1 and five second logic low periods TL2 included in control pulses. In this case, a data value '481' may be expressed as nine control pulses, and thus, under the same condition, a transfer/reception time of the control command data CData may largely decrease to about 44 μs compared to FIG. 3 requiring 481 control pulses.

Figure 6:
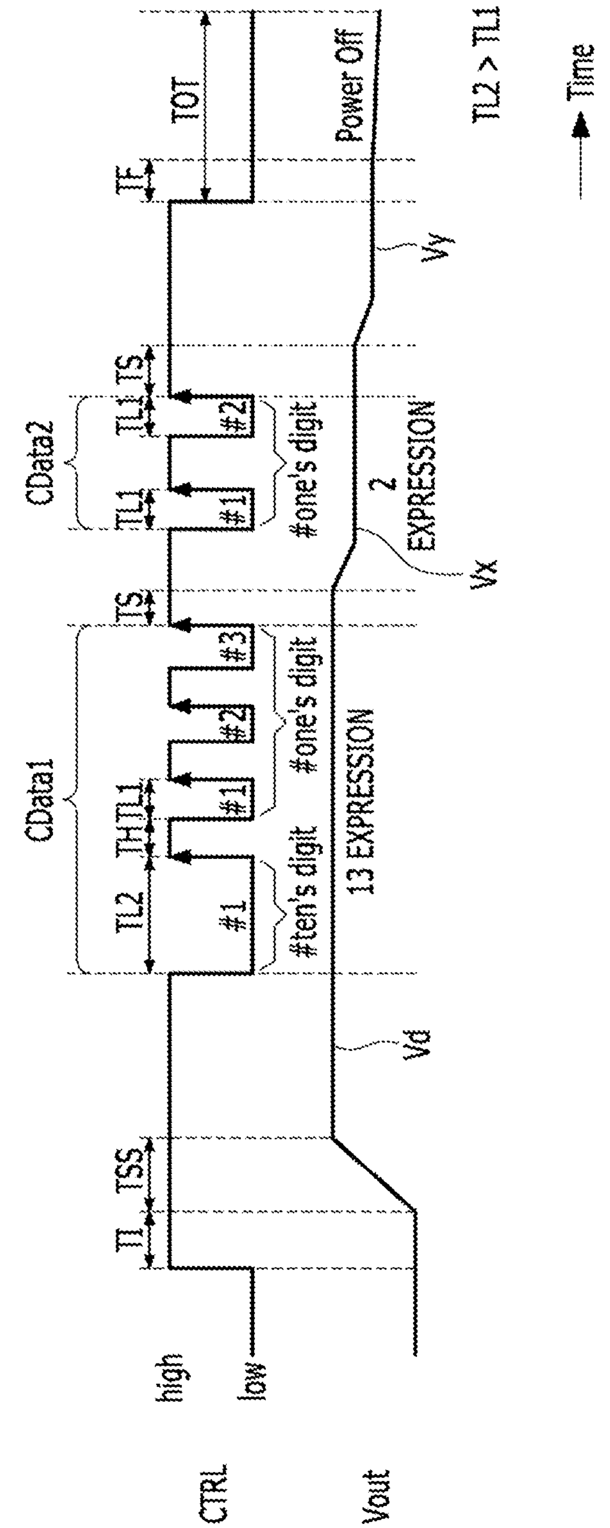
FIG. 6 is a waveform diagram showing an example where an output level of a source voltage is changed based on a power control signal where control command data is encoded, in another embodiment of the present disclosure.

FIG. 6 is a waveform diagram showing an example where an output level of a source voltage is changed based on a power control signal where control command data is encoded, in another embodiment of the present disclosure.

Referring to FIG. 6, control command data CData1 and CData2 and a plurality of sequence timing control signals may be further encoded into a power control signal CTRL.

The sequence timing control signals may be substantially the same as the description of FIG. 3.

In some implementations, each of the control command data CData1 and CData2 may be implemented as a plurality of control pulses where a logic low period TL and a logic high period TH are alternated. The logic high periods TH of the control pulses may have the same length, and the logic low periods TL may have two or more different lengths. It should be noted that in some other implementations, the logic low periods TL of the control pulses may have the same length, and the logic high periods TH may have two or more different lengths. The scope of the disclosure is not limited by the use of any specific logic level of the control pulses to represent the information.

In some implementations, each of logic low periods, having different lengths, of control pulses may indicate a place value of a data value of each of the control command data CData1 and CData2, and the number of continuous logic low periods, which are repeated with the same length, of control pulses may indicate a digit corresponding to the place value. In some other implementations, each of logic high periods, having different lengths, of control pulses may indicate a place value of a data value of each of the control command data CData1 and CData2, and the number of continuous logic high periods, which are repeated with the same length, of control pulses may indicate a digit corresponding to the place value.

In detail, logic low periods of control pulses may include one or more first logic low periods TL1 having a first length and one or more second logic low periods TL2 having a second length which is greater than the first length and may further include one or more third logic low periods TL3 (see FIG. 7) having a third length which is greater than the second length.

A first logic low period TL1 may indicate one's place value of each of the control command data CData1 and CData2, and a second logic low period TL2 may indicate ten's place value of each of the control command data CData1 and CData2. Also, a third logic low period TL3 may indicate hundred's place value of each of the control command data CData1 and CData2. As the kinds of place value of control command data increases, the number of logic low periods having different lengths may increase. In the present embodiment, for convenience, an example may be described where a place value of control command data is limited to one, ten, and hundred.

The number of first logic low periods TL1 which are continued in control pulses may indicate a digit of the one's place value, and the number of second logic low periods TL2 which are continued in the control pulses may indicate a digit of the ten's place value. Also, the number of third logic low periods TL3 which are continued in the control pulses may indicate a digit of the hundred's place value.

To clearly indicate a place value and a digit of the place value, the temporal sequence of one or more second logic low periods TL2 in control pulses may precede the temporal sequence of one or more first logic low periods TL1 in the control pulses. Also, the temporal sequence of one or more third logic low periods TL3 in the control pulses may precede the temporal sequence of one or more second logic low periods TL2 in the control pulses.

For example, first control command data CData1 may include control pulses where one second logic low period TL2 and three continuous first logic low periods TL1 are sequentially arranged, and thus, a data value of the first control command data CData1 may indicate '13.' The power source unit 500 (see FIG. 1) may receive a first control command, based on the data value '13' of the first control command data CData1, and may shift an output level of a source voltage Vout from a default level Vd to a first level Vx, based on the first control command.

As another example, second control command data CData2 may include two continuous first logic low periods TL1, and thus, a data value of the second control command data CData2 may indicate '2.' The power source unit 500 may receive a second control command, based on the data value '2' of the second control command data CData2, and may shift the output level of the source voltage Vout from the first level Vx to a second level Vy, based on the second control command.

Figure 7:
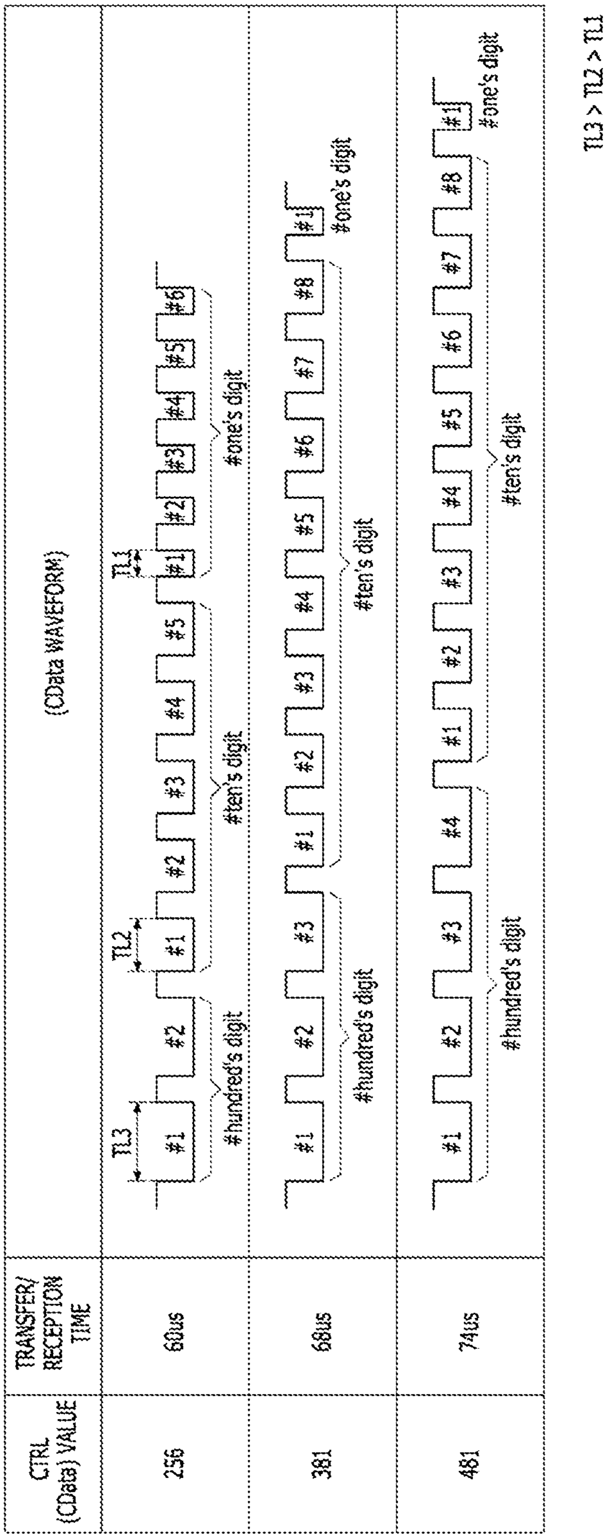
FIG. 7 is a diagram showing various values of control command data and waveforms and transfer/reception times of control command data corresponding thereto, in another embodiment of the present disclosure.

FIG. 7 is a diagram showing various values of control command data and waveforms and transfer/reception times of control command data corresponding thereto, in another embodiment of the present disclosure.

Referring to FIG. 7, various data values of control command data CData encoded into a power control signal CTRL are shown.

The control command data CData may indicate a data value '256,' based on a temporal arrangement combination of two continuous third logic low periods TL3, five continuous second logic low periods TL2, and six continuous first logic low periods TL1, which are included in control pulses. In this case, 256 may be expressed as 13 control pulses, and thus, under the same condition, a transfer/reception time of the control command data CData may largely decrease to about 60 μs compared to FIG. 3 requiring 256 control pulses.

The control command data CData may indicate a data value '381,' based on a temporal arrangement combination of three continuous third logic low periods TL3, eight continuous second logic low periods TL2, and one first logic low period TL1, which are included in control pulses. In this case, 381 may be expressed as 12 control pulses, and thus, under the same condition, a transfer/reception time of the control command data CData may largely decrease to about 68 μs compared to FIG. 3 requiring 381 control pulses.

The control command data CData may indicate a data value '481,' based on a temporal arrangement combination of four continuous third logic low periods TL3, eight continuous second logic low periods TL2, and one first logic low period TL1, which are included in control pulses. In this case, 481 may be expressed as 13 control pulses, and thus, under the same condition, a transfer/reception time of the control command data CData may largely decrease to about 74 μs compared to FIG. 3 requiring 481 control pulses.

Figure 8:
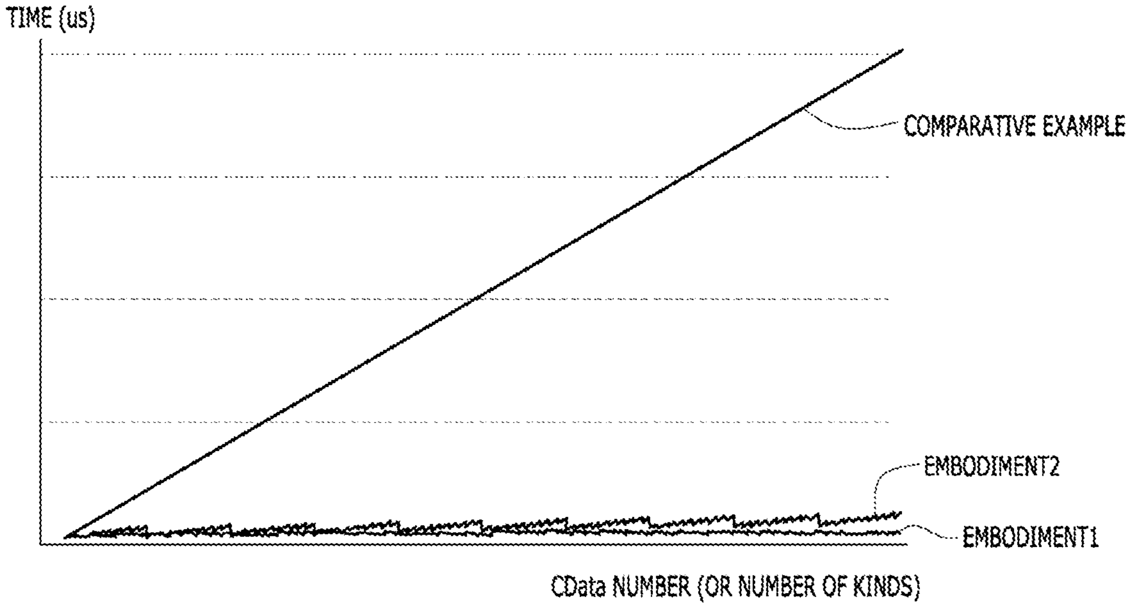
FIG. 8 is a diagram showing an example where transfer/reception times of control command data are far more reduced in the embodiments of FIGS. 4 and 6 than the comparative example of FIG. 3.

FIG. 8 is a diagram showing an example where transfer/reception times of control command data are far more reduced in the embodiments of FIGS. 4 and 6 than the comparative example of FIG. 3.

As described above with reference to FIGS. 5 and 7, comparing with the comparative example of FIG. 3, in embodiments of the present disclosure, despite an increase in the kinds and number of control command data CData, an interfacing time needed for transferring/receiving a power control signal may be shortened without an increase in the number of transfer ports of a power interface circuit.

The embodiments may realize the following effects.

In the embodiments, by applying the weighted binary digits scheme shown in FIG. 4 or the weighted decimal digits scheme shown in FIG. 6, despite an increase in the kinds and number of power control commands, an interfacing time needed for transferring/receiving a power control signal may be shortened without an increase in the number of transfer ports of a power interface circuit.

The effects according to the present disclosure are not limited to the above examples, and other various effects may be included in the specification.

While the present disclosure has been particularly shown and described with reference to example embodiments thereof, it will be understood by those of ordinary skill in the art that various changes in form and details may be made therein without departing from the spirit and scope of the present disclosure.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A power control device of a display apparatus, the display apparatus having a display panel that includes a plurality of pixels, the power control device comprising:
- a panel driver configured to drive the display panel;
- a power control circuit configured to output a power control signal, the power control signal including control command data; and
- a power source circuit configured to shift an output level of a source voltage provided to the display panel and the panel driver, based on the control command data,
- wherein the control command data comprises a plurality of control pulses having alternating logic low periods and logic high periods,
- wherein the logic low periods include two or more different lengths, different lengths of logic low periods indicating different binary digits, and
- wherein the logic high periods have a same length as one another.

2. The power control device of claim 1, wherein the logic low periods of the plurality of control pulses indicate a bit value of the control command data.

3. The power control device of claim 2, wherein the logic low periods of the plurality of control pulses comprise one or more first logic low periods having a first length and one or more second logic low periods having a second length which is different from the first length,
- the one or more first logic low periods indicate a bit value '0', and
- the one or more second logic low periods indicate a bit value '1'.

4. The power control device of claim 2, wherein the power source circuit is configured to receive bit values of the control command data in a first sequence from a least significant bit (LSB) to a most significant bit (MSB), or receive the bit values of the control command data in a second sequence from the most significant bit (MSB) to the least significant bit (LSB).

5. The power control device of claim 1, wherein a first logic low period having a length different from an immediately preceding logic low period of the plurality of control pulses indicates a place value of a data value of the control command data, and
- a number of continuous logic low periods that include a same length as the first logic low period indicates a digit corresponding to the place value.

6. The power control device of claim 5, wherein the logic low periods of the plurality of control pulses comprise one or more first logic low periods each having a first length and one or more second logic low periods each having a second length which is different from the first length,
- the one or more first logic low periods indicate a one's place value of the control command data,
- the one or more second logic low periods indicate a ten's place value of the control command data,
- a number of continuous first logic low periods indicate a digit corresponding to the one's place value, and
- a number of continuous second logic low periods indicate a digit corresponding to the ten's place value.

7. The power control device of claim 6, wherein, in the plurality of control pulses, a temporal sequence of the one or more second logic low periods precedes a temporal sequence of the one or more first logic low periods.

8. A power control method of a display apparatus, the power control method comprising:
- outputting a power control signal, the power control signal including one or more pieces of control command data; and
- shifting an output level of a source voltage provided to a display panel and a panel driver based on the control command data,
- wherein the control command data comprises a plurality of control pulses having alternating logic low periods and logic high periods,
- wherein the logic low periods include two or more different lengths, different lengths of logic low periods indicating different binary digits, and
- wherein the logic high periods have a same length as one another.

9. The power control method of claim 8, wherein the logic low periods of the plurality of control pulses indicate a bit value of the control command data.

10. The power control method of claim 9, wherein the logic low periods of the plurality of control pulses comprise one or more first logic low periods having a first length and one or more second logic low periods having a second length which is different from the first length,
- the one or more first logic low periods indicate a bit value '0', and
- the one or more second logic low periods indicate a bit value '1'.

11. The power control method of claim 9, further comprising receiving bit values of the control command data in a first sequence from a least significant bit (LSB) to a most significant bit (MSB), or receiving the bit values of the control command data in a second sequence from the most significant bit (MSB) to the least significant bit (LSB).

12. The power control method of claim 8, wherein a first logic low period having a length different from an immediately preceding logic low period of the plurality of control pulses indicates a place value of a data value of the control command data, and
- a number of continuous logic low periods that include a same length as the first logic low period indicates a digit corresponding to the place value.

13. The power control method of claim 12, wherein the logic low periods of the plurality of control pulses comprise one or more first logic low periods each having a first length and one or more second logic low periods each having a second length which is different from the first length, the one or more first logic low periods indicate a one's place value of the control command data, the one or more second logic low periods indicate a ten's place value of the control command data, a number of continuous first logic low periods indicates a digit corresponding to the one's place value, and a number of continuous second logic low periods indicates a digit corresponding to the ten's place value.

14. The power control method of claim 13, wherein, in the plurality of control pulses, a temporal sequence of the one or more second logic low periods precedes a temporal sequence of the one or more first logic low periods.

15. A display apparatus comprising:

a display panel that includes a plurality of pixels, and a power control device connected to the display panel, the power control device including:

a panel driver configured to drive the display panel;

a power control circuit configured to output a power control signal, the power control signal including control command data; and a power source circuit configured to shift a level of a voltage provided to the display panel and the panel driver, based on the control command data, wherein the control command data includes a plurality of control pulses, the plurality of control pulses including a plurality of first periods of a first logic level and a plurality of second periods of a second logic level, each first period immediately adjacent to a second period, and each second period immediately adjacent to a first periods, wherein the plurality of first periods include two or more different lengths, different lengths of logic low periods indicating different binary digits, and wherein the plurality of second periods have a same length as one another.

16. The display apparatus of claim 15, wherein the plurality of first period indicate a bit value of the control command data.

17. The display apparatus of claim 15, wherein a length of a first period indicates a place value of a data value of the control command data, and a number of continuous first periods including the first period that have the length indicates a digit corresponding to the place value.

* * * * *